(12) United States Patent
Onal et al.

(10) Patent No.: US 11,016,180 B2
(45) Date of Patent: May 25, 2021

(54) COMBINATION PHOTODETECTOR ARRAYS FOR EXTENDED DYNAMIC RANGE

(71) Applicant: Waymo LLC, Mountain View, CA (US)

(72) Inventors: Caner Onal, Palo Alto, CA (US); Blaise Gassend, East Palo Alto, CA (US); Pierre-yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 825 days.

(21) Appl. No.: 15/714,435

(22) Filed: Sep. 25, 2017

(65) Prior Publication Data
US 2019/0094361 A1 Mar. 28, 2019

(51) Int. Cl.
*G01S 7/48* (2006.01)
*G01S 7/481* (2006.01)
(Continued)

(52) U.S. Cl.
CPC ........... *G01S 7/4816* (2013.01); *G01J 1/4228* (2013.01); *G01S 7/4863* (2013.01); *G01S 7/4868* (2013.01);
(Continued)

(58) Field of Classification Search
CPC combination set(s) only.
See application file for complete search history.

(56) References Cited

U.S. PATENT DOCUMENTS 5,892,575 A 4/1999 Marino
6,407,439 B1 6/2002 Hier et al.
(Continued)

FOREIGN PATENT DOCUMENTS

WO 2010/073136 7/2010
WO 2014/066813 5/2014
WO 2016/003451 1/2016

OTHER PUBLICATIONS

International Searching Authority, International Search Report and Written Opinion dated Dec. 14, 2018, issued in connection with International Patent Application No. PCT/US2018/052392, filed on Sep. 24, 2018, 17 pages.
(Continued)

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to methods and systems that improve the dynamic range of LIDAR systems. An example system includes a plurality of single-photon photodetectors and at least one additional photodetector monolithically integrated on a shared substrate. The plurality of single-photon photodetectors and the at least one additional photodetector are configured to detect light from a shared field of view. The system also includes a controller configured to carry out operations. The operations include: receiving respective photodetector signals from the plurality of single-photon photodetectors and the at least one additional photodetector; selecting a photodetector signal from at least two of: the two received photodetector signals and a combined photodetector signal formed by combining the two received photodetector signals; and determining an intensity of light in the field of view based on the selected photodetector signal.

20 Claims, 7 Drawing Sheets

(51) Int. Cl.
*G01S 7/486* (2020.01)
*G01S 7/4863* (2020.01)
*G01S 17/894* (2020.01)
*G01J 1/42* (2006.01)
*G01S 17/08* (2006.01)
*G01J 1/44* (2006.01)

(52) U.S. Cl.
CPC ............ *G01S 17/08* (2013.01); *G01S 17/894* (2020.01); *G01J 2001/442* (2013.01); *G01J 2001/4466* (2013.01)

(56) References Cited

U.S. PATENT DOCUMENTS

| | | | |
|---|---|---|---|
| 7,295,303 B1* | 11/2007 | Vaez-Iravani | G01N 21/95623 356/237.1 |
| 7,544,945 B2 | 6/2009 | Tan et al. | |
| 8,660,236 B2 | 2/2014 | Carmi et al. | |
| 8,742,316 B2 | 6/2014 | Kim et al. | |
| 2006/0124832 A1 | 6/2006 | Harmon et al. | |
| 2011/0216304 A1* | 9/2011 | Hall | G01S 7/4813 356/4.01 |
| 2011/0240865 A1 | 10/2011 | Frach et al. | |
| 2014/0118730 A1* | 5/2014 | Kavaldjiev | H01L 27/1446 356/237.5 |
| 2016/0043268 A1 | 2/2016 | Bai et al. | |
| 2019/0049588 A1* | 2/2019 | Turbide | G01S 17/08 |

OTHER PUBLICATIONS

Notice of Reasons for Rejection dated Feb. 1, 2021 for Japanese Application No. 2020-515976.

* cited by examiner

COMBINATION PHOTODETECTOR ARRAYS FOR EXTENDED DYNAMIC RANGE

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR system may emit near-infrared light pulses, which may interact with objects in the system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object.

SUMMARY

The present disclosure relates to methods and systems that improve the dynamic range of LIDAR systems. For example, a receiver subsystem of a LIDAR system may utilize inputs from different types of photodetectors so as to provide a higher dynamic range LIDAR imaging capability.

In a first aspect, a system is provided. The system includes a substrate, a plurality of single-photon photodetectors coupled to the substrate, and at least one additional photodetector coupled to the substrate. The single-photon photodetectors and the at least one additional photodetector are arranged to detect light from a field of view. The at least one additional photodetector is other than a single-photon photodetector. The system also includes a controller configured to execute program instructions so as to carry out operations. The operations include receiving a first photodetector signal from the plurality of single-photon photodetectors. The first photodetector signal is indicative of light from the field of view detected by the single-photon photodetectors. The operations also include receiving a second photodetector signal from the at least one additional photodetector. The second photodetector signal is indicative of light from the field of view detected by the at least one additional photodetector. The operations additionally include selecting a photodetector signal from at least two of: the first photodetector signal, the second photodetector signal, and a combined photodetector signal formed by combining the first and second photodetector signals. The operations yet further include determining an intensity of light in the field of view based on the selected photodetector signal.

In a second aspect, a method is provided. The method includes receiving a first photodetector signal from a plurality of single-photon photodetectors. The first photodetector signal is indicative of light from a field of view detected by the single-photon photodetectors. The method also includes receiving a second photodetector signal from at least one additional photodetector. The second photodetector signal is indicative of light from the field of view detected by the at least one additional photodetector. The at least one additional photodetector is other than a single-photon photodetector. The plurality of single-photon photodetectors and the at least one additional photodetector are coupled to a substrate. The method additionally includes selecting a photodetector signal from at least two of: the first photodetector signal, the second photodetector signal, and a combined photodetector signal formed by combining the first and second photodetector signals. The method yet further includes determining an intensity of light in the field of view based on the selected photodetector signal.

Other aspects, embodiments, and implementations will become apparent to those of ordinary skill in the art by reading the following detailed description, with reference where appropriate to the accompanying drawings.

DETAILED DESCRIPTION

Figure 1A:
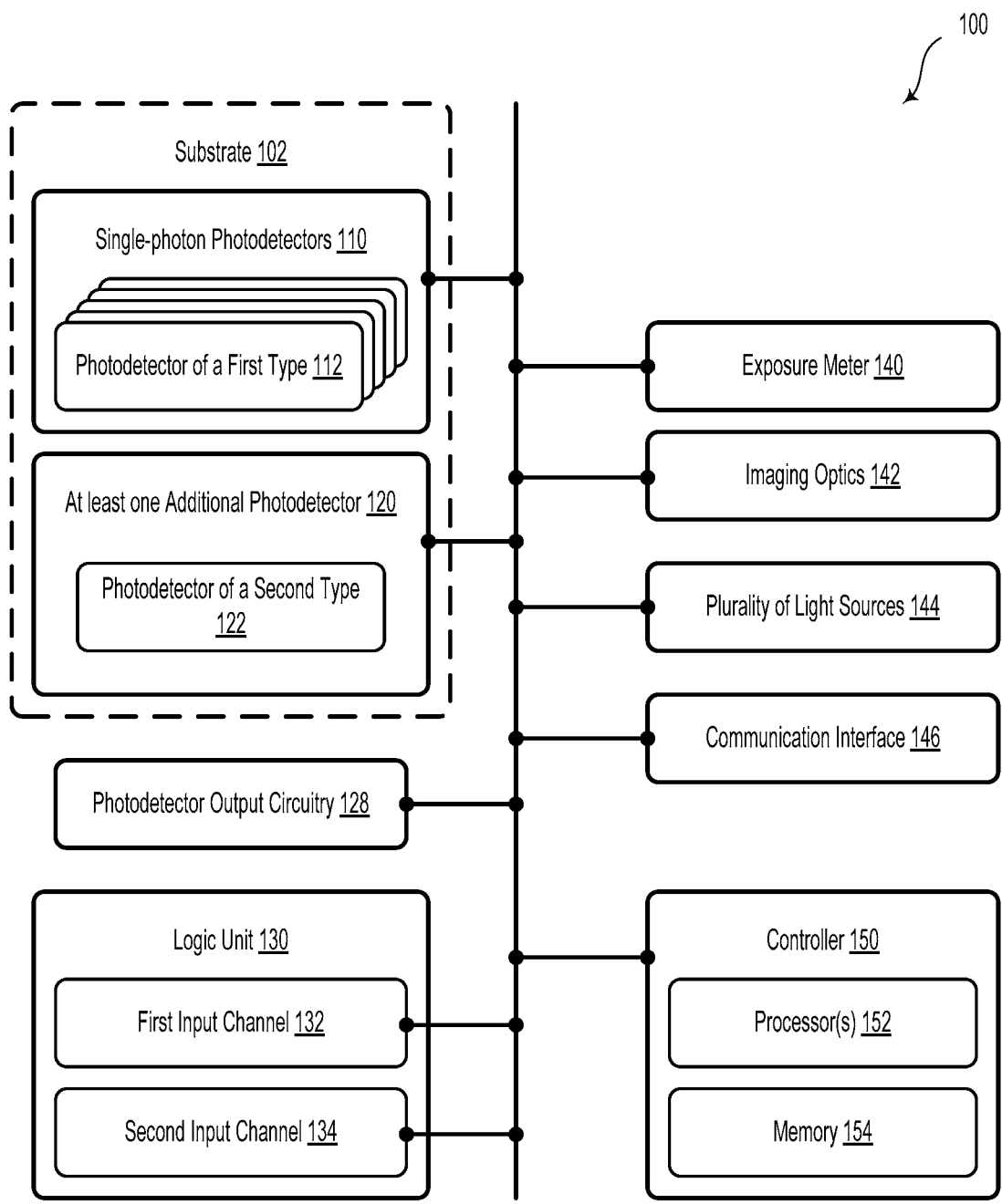
FIG. 1A illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

While operated in Geiger mode, silicon photomultiplier detectors (SiPMs), single photon avalanche diodes (SPADs), or other types of sensitive photodetectors can provide single photon-level sensing, however such devices generally provide a relatively low dynamic range (e.g., 0-3000 photons). As an example, SiPMs may become saturated in scenarios with relatively high light levels (e.g., retroreflection, close range objects, etc.).

In contrast, linear mode avalanche photodiodes (LmAPDs) provide a higher dynamic range, but are not able to detect light at the single photon level. That is, LmAPDs lack extremely low light detection capability.

Embodiments include systems and methods involving a combination of different photodetectors (e.g., SiPMs and LmAPDs) having different respective photosensitivity, spectral responsivity, and/or dynamic range attributes. Such detector combinations may provide low light detection as well as high dynamic range at high light levels (e.g., scenes with retroreflections, close range objects, etc.). Example embodiments include a combination of APDs and SiPMs integrated in a monolithic manner. That is, the APDs and SiPMs may be collocated on the same board and/or even the same substrate. As an example embodiment, APD devices could be fabricated on the same substrate as a SiPM detector array using one or two additional photolithography mask fabrication steps.

Output signals (e.g., photosignals) from a plurality of detectors of a first detector type (e.g., SiPMs) may be routed to a first input channel on a microcontroller or logic unit. Similarly, output signals from a plurality of detectors of a second detector type (e.g., APDs) may be routed to a second input channel of the microcontroller or logic unit. In low light situations, the logic unit may select the SiPM signal as being representative of the actual light intensity and ignore the noisy or non-linear APD signal. In bright light scenarios, the logic unit may select the APD signal as being representative of the actual light intensity and ignore the saturated SiPM signal. In other light level scenarios, the respective signals from the APD and SiPM may be mixed or weighted in varying proportions to provide a substantially linear signal intensity versus photons detected.

In another embodiment, pairs of APDs and SiPMs could be arranged in a parallel circuit. In some embodiments, such paired detectors may be coupled using a pole zero network. In such a scenario, the current through the parallel combination could provide an analog signal indicative of the actual light level.

In an alternative embodiment, PIN diodes could be used instead of, or in addition to the APDs. That is, in some embodiments, imaging systems may incorporate more than two types of detectors (e.g., SiPM, APD, PIN diode, bolometer, photoconductor, etc.). In other embodiments, the APD devices could be stacked underneath corresponding SiPM devices. In such a scenario, photons that are not absorbed by the SiPM devices may be transmitted through the SiPM (and possibly interposing materials) to the APD devices. In such a manner, both low light levels and bright light levels could be detected.

II. Example Systems

FIG. 1A illustrates a system 100, according to an example embodiment. The system 100 includes a plurality of single-photon photodetectors 110 that is coupled to a substrate 102. The plurality of single-photon photodetectors 110 includes a plurality of photodetectors of a first photodetector type 112.

The system 100 also includes at least one additional photodetector 120 that is coupled to the substrate 102. The at least one additional photodetector 120 includes one or more photodetectors of a second photodetector type 122. That is, the at least one additional photodetector is a photodetector that is not a single-photon photodetector. In some embodiments, the first photodetector type includes a silicon photomultiplier (SiPM) detector. Example embodiments may include the second photodetector type as being at least one of: an avalanche photodiode (APD) detector or a PIN photodiode detector. Other photodetector types are also possible and contemplated herein.

In some embodiments, the substrate 102 may include a first surface. In such scenarios, the first surface could be disposed along a primary plane of the substrate 102.

The plurality of single-photon photodetectors 110 and the at least one additional photodetector 120 could be coupled to the first surface. For example, the plurality of single-photon photodetectors 110 and the at least one additional photodetector 120 could be disposed in a side-by-side arrangement on the same surface of the substrate 102.

In another embodiment, at least a portion of detectors of the plurality of single-photon photodetectors 110 could be arranged along the first surface among at least a portion of detectors of the at least one additional photodetector 120 so as to form an intermingled photodetector arrangement. In other embodiments, the plurality of single-photon photodetectors 110 and the at least one additional photodetector 120 could be disposed in other arrangements and/or coupled to different surfaces of the substrate 102.

Other arrangements of the plurality of single-photon photodetectors 110 and the at least one additional photodetector 120 are possible. For example, the plurality of single-photon photodetectors 110 could be coupled to an upper surface of the at least one additional photodetector 120 so as to form a stacked photodetector arrangement.

Yet further, while examples described herein relate to the substrate 102, it will be understood that other embodiments could include the respective detectors arranged on two or more substrates. For instance, the plurality of single photon photodetectors 110 could be arranged along a surface of a first substrate and the at least one additional photodetector 120 could be arranged along a surface of a second substrate. Other detector arrangements that include more than one substrate are possible and contemplated herein.

In some embodiments, the plurality of single-photon photodetectors 110 are arranged to detect light from a field of view. In such scenarios, the at least one additional photodetector 120 is arranged to detect light from at least a portion of the same field of view. In an example embodiment, the system 100 includes imaging optics 142. In such scenarios, the plurality of single-photon photodetectors 110 and the at least one additional photodetector 120 may both detect light from the shared field of view by way of the imaging optics 142.

In some embodiments, the system 100 includes photodetector output circuitry 128. The plurality of single-photon photodetectors 110 and the at least one additional photodetector 120 may be coupled to the photodetector output circuitry 128.

The system 100 also includes a logic unit 130. In an example embodiment, the logic unit 130 includes a first input channel 132 and a second input channel 134. In such a scenario, respective photodetector signals of the plurality of single-photon photodetectors 110 are routed to a first input channel 132 of the logic unit 130. The respective photodetector signals of the at least one additional photodetector 120 are routed to a second input channel 134 of the logic unit 130.

In an example embodiment, while in a low light situation, the logic unit 130 may select the SiPM signal as being representative of the actual light intensity and ignore a noisy or non-linear APD signal. In contrast, in bright light scenarios, the logic unit 130 may select the LmAPD signal as being representative of the actual light intensity and ignore the saturated SiPM signal. In other light level scenarios, the respective signals from the LmAPD and SiPM may be mixed or weighted in varying proportions to provide a substantially linear signal intensity versus photons detected.

In some embodiments, the system 100 includes an exposure meter 140. The exposure meter 140 may be configured to provide information indicative of a lighting condition to the logic unit 130. In at least some embodiments, the logic unit 130 may provide a combined image based on the lighting condition.

In some example embodiments, the system 100 may include a plurality of light sources 144. The plurality of light sources 144 may include lasers, although other types of light sources are also contemplated. Some embodiments may include the plurality of light sources 144 may include 256 laser light sources. In such scenarios, the plurality of single-photon photodetectors 110 and the at least one additional photodetector 120 may each include 256 photodetectors. Other amounts of light sources and photodetectors are possible and contemplated.

The system 100 additionally includes a controller 150. In some embodiments, controller 150 may include some or all of the functionality of logic unit 130. The controller 150 includes at least one processor 152 and a memory 154. The at least one processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The at least one processor 152 is configured to execute program instructions stored in the memory 154 so as to carry out operations. In some embodiments, the operations include receiving a first photodetector signal from the plurality of single-photon photodetectors. In some embodiments, the first photodetector signal may be indicative of light from the field of view detected by the single-photon photodetectors.

The operations additionally include receiving a second photodetector signal from the at least one additional photodetector. In such scenarios, the second photodetector signal may be indicative of light from the field of view detected by the at least one additional photodetector.

The operations also include selecting a photodetector signal from at least two of: the first photodetector signal, the second photodetector signal, and a combined photodetector signal formed by combining the first and second photodetector signals.

Yet further, the operations include determining an intensity of light in the field of view based on the selected photodetector signal.

In some embodiments, the operations may include receiving information indicative of an exposure condition of at least a portion of the shared field of view. For example, the exposure meter 140 may provide information about the exposure condition. In such scenarios, the combined photodetector signal may be formed by a combination of the first and second photodetectors that is based on the exposure condition.

The controller 150 may include a computer disposed on a vehicle, an external computer, or a mobile computing platform, such as a smartphone, tablet device, personal computer, wearable device, etc. Additionally or alternatively, the controller 150 may include, or be connected to, a remotely-located computer system, such as a cloud server. In an example embodiment, the controller 150 may be configured to carry out some or all method blocks or steps described herein.

In some embodiments, the operations include selecting the photodetector signal. Selecting the photodetector signal may include comparing the first photodetector signal to a first threshold. The first threshold could be a threshold voltage, a threshold current, and/or a rate of change of a voltage or current. In response to a determination that the first photodetector signal is less than the first threshold, the operations may include selecting the first photodetector signal as the selected photodetector signal. That is, in some embodiments, if a photocurrent or photovoltage is below a threshold current or threshold voltage, a signal from the single photon detectors may be desirable. That is, at low light levels, the SiPM signals may be the only relevant photosignals as the APDs or other photodetectors may not be able to detect photons at such low levels.

In some embodiments, the operations may include comparing the second photodetector signal to a second threshold. The second threshold could be, for example, a threshold voltage or threshold current (or rate of change of voltage/current) that could be indicative of a relatively high light level (e.g., a light level at which APDs may be effective). In such a scenario, in response to a determination that the second photodetector signal is greater than the second threshold, the operations may include selecting the second photodetector signal as the selected photodetector signal. That is, at relatively high light levels, the non-single photon detectors could be selected.

In yet further embodiments, selecting the photodetector signal may include comparing the first photodetector signal to a first threshold, comparing the second photodetector signal to a second threshold, and, in response to a determination that the first photodetector signal is greater than the first threshold and the second photodetector signal is less than the second threshold, combining the first and second photodetector signals and selecting the combined photodetector signal as the selected photodetector signal. In other words, if the photon flux is greater than a minimum threshold photocurrent/photovoltage but less than a maximum photocurrent/photovoltage, the signals from the first and second photodetectors could be combined so as to provide a higher dynamic range than if the photodetectors were utilized alone.

Some example embodiments need not include one or more comparisons to a threshold. In such scenarios, an operation could be performed on the first and the second photodetector signals so as to combine them. For example, combining the first and the second photodetector signals could include taking a weighted sum based on the first and the second photodetector signals.

In some embodiments, combining the first and second photodetector signals may include adjusting the first photodetector signal. In such scenarios, adjusting the first photodetector signal may include multiplying the first photodetector signal by a first value of a high dynamic range profile. Combining the first and second photodetector signals may include adjusting the second photodetector signal. In such scenarios, adjusting the second photodetector signal may include multiplying the second photodetector signal by a second value of the high dynamic range profile. Combining the first and second photodetector signals may also include summing the adjusted first and second photodetector signals.

It will be understood that other ways of combining the first and second photodetector signals are contemplated herein.

In some embodiments, the high dynamic range profile could include a look up table (LUT). At least some information in the look up table could include values between 0.0 and 1.0. For example, the look up table may include three columns. A first column could include a range of exposure conditions or photon flux levels. A second column could include values between 0.0 and 1.0 that represent a multiplier for the photosignals from the first detector array 110. A third column could include values between 1.0 to 0.0 that represent a multiplier for the photosignals from the at least one additional photodetector 120. In such scenarios, the look up table may provide information to appropriately mix the respective photosignals from the first detector array 110 and the at least one additional photodetector 120 based on a present exposure condition. Other information, arrangements, and/or values may be included in the look up table. As an example, the look up table may include two columns, a first column that may include a range of values of photosignals from the first detector array 110. In such a scenario, the second column could include values between 0.0 and 1.0 that might represent the multiplier for the photosignals from the at least one additional photodetector 120.

In example embodiments involving the plurality of light sources 144, the operations may include causing the plurality of light sources 144 to emit light into an external environment of the system so as to interact with objects in the external environment to provide reflected light. The light detected from the shared field of view may include at least a portion of the reflected light. In such scenarios, the system 100 includes at least a portion of a light detection and ranging (LIDAR) system. The LIDAR system may be configured to provide information (e.g., point cloud data) about one or more objects (e.g., location, shape, etc.) in the external environment. While some described embodiments include several light sources, other embodiments contemplated herein may include a single light source.

In an example embodiment, the LIDAR system could provide point cloud information, object information, mapping information, or other information to a vehicle. The vehicle could be a semi- or fully-automated vehicle. For instance, the vehicle could be a self-driving car or an autonomous drone, an autonomous truck, or an autonomous robot. Other types of vehicles are contemplated herein.

System 100 may include a communication interface 146. The communication interface 146 may be configured to provide a communication link between various elements of system 100 such as the controller 150, the plurality of single-photon photodetectors 110, the at least one additional photodetector 120, the logic unit 130, one or more computing networks, and/or other vehicles.

The communication interface 146 could be, for example, a system configured to provide wired or wireless communication between one or more other vehicles, sensors, or other elements described herein, either directly or via a communication network. To this end, the communication interface 146 may include an antenna and a chipset for communicating with the other vehicles, sensors, servers, or other entities either directly or via the communication network. The chipset or communication interface 146 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIG-BEE, dedicated short range communications (DSRC), and radio frequency identification (RFID) communications, among other possibilities. The communication interface 146 may take other forms as well.

Figure 1B:
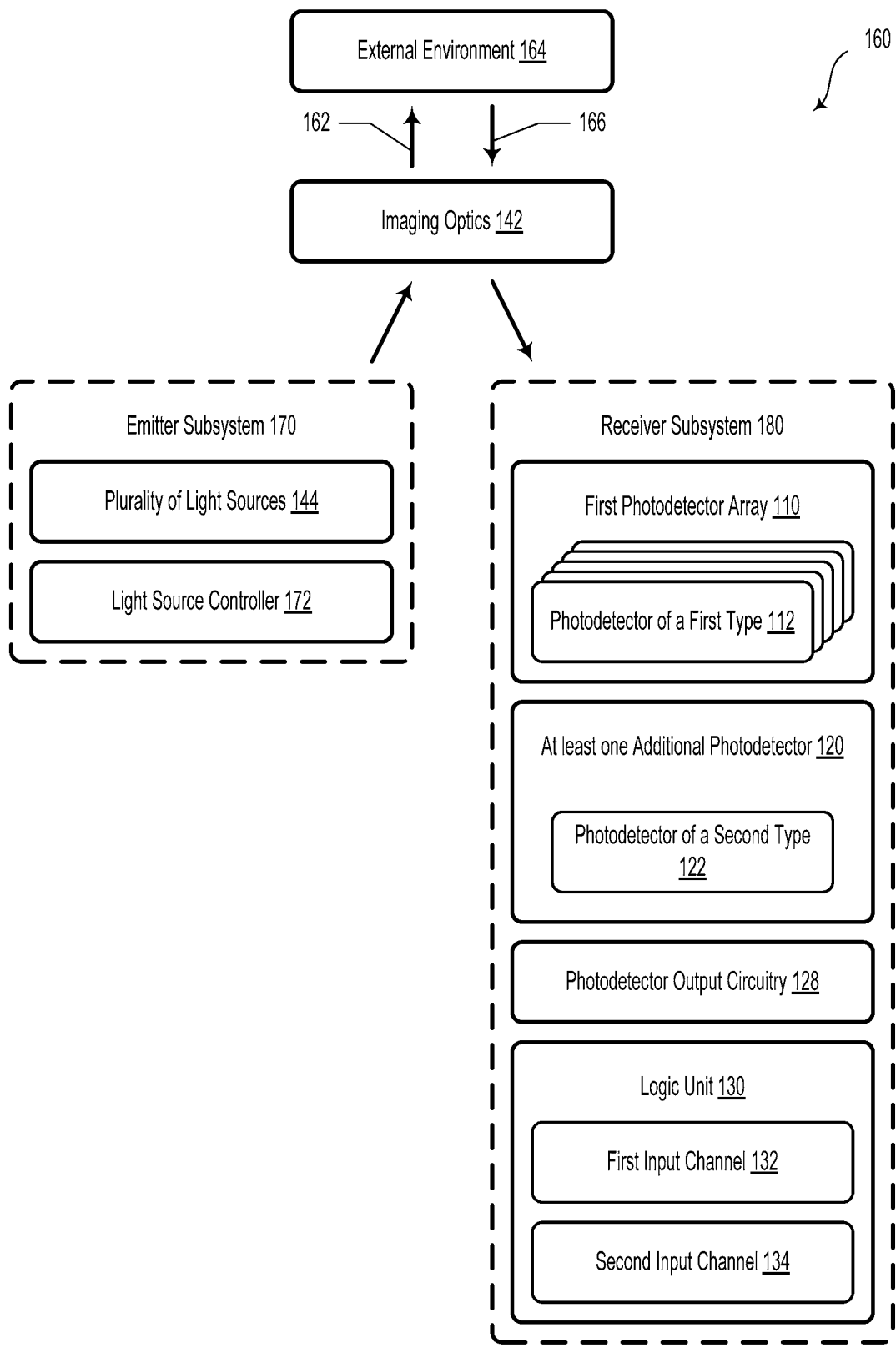
FIG. 1B illustrates a system, according to an example embodiment.

FIG. 1B illustrates a system 160, according to an example embodiment. System 160 may include some, or all, of the elements of system 100, as illustrated and described with reference to FIG. 1A. For example, system 160 may include an emitter subsystem 170, which may include the plurality of light sources 144 and a light source controller 172. The plurality of light sources 144 may be controlled by the light source controller 172.

System 160 also includes a receiver subsystem 180. The receiver subsystem 180 may include the plurality of single-photon photodetectors 110 with the plurality of photodetectors of the first type 112 and the at least one additional photodetector 120 having one or more photodetectors of the second type 122. Furthermore, the photodetectors of the plurality of single-photon photodetectors 110 and the at least one additional photodetector 120 could be coupled to the photodetector output circuitry 128.

The receiver subsystem 180 also includes the logic unit 130. The logic unit 130 includes the first input channel 132 and the second input channel 134.

The emitter subsystem 170 and the receiver subsystem 180 may be coupled to the imaging optics 142. In such a scenario, the plurality of light sources 144 may be configured to emit light pulses 162 into an external environment 164 of the system 160. The light pulses 162 may interact with objects in the external environment 164. For example, the light pulses 162 may be reflected by the objects, at least in part, back towards the receiver subsystem 180 as reflected light 166. The reflected light 166 may be received by the receiver subsystem 180 via the imaging optics 142.

Figure 1C:
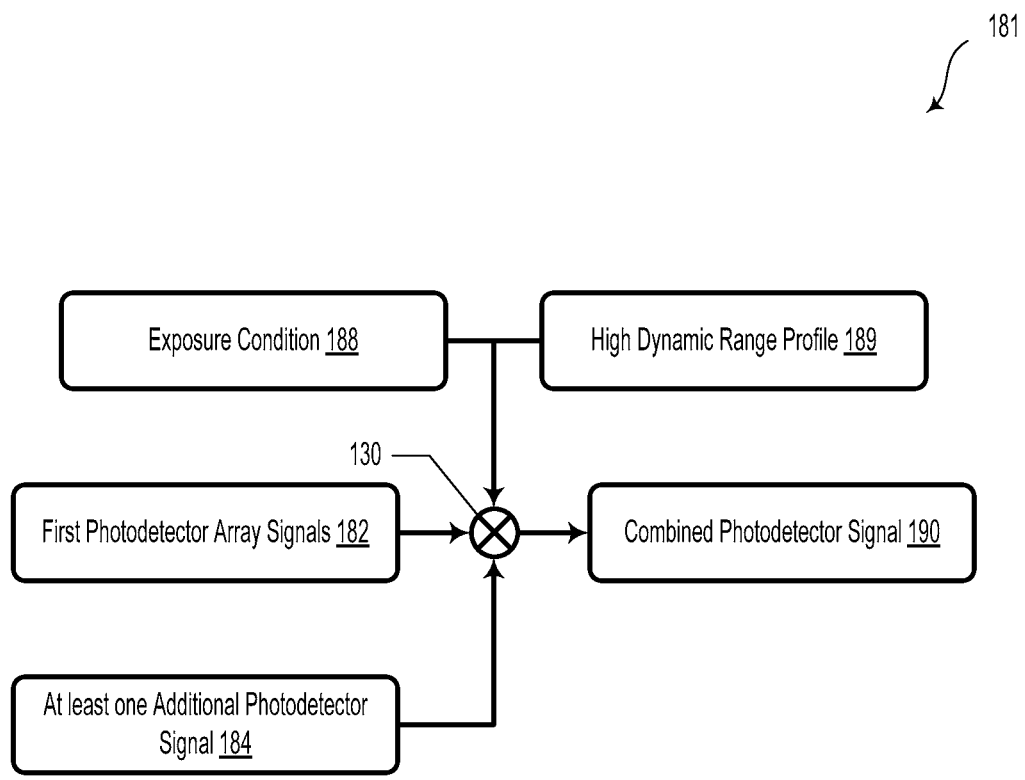
FIG. 1C illustrates a scenario, according to an example embodiment.

FIG. 1C illustrates a system 181, according to an example embodiment. System 181 may illustrate some elements, processes, or methods as illustrated and described with reference to FIGS. 1A, 1B, 2A, 2B, 3, and/or 4. For example, the plurality of single-photon photodetectors 110 may provide plurality of single-photon photodetector signals 182. The at least one additional photodetector 120 may provide at least one additional photodetector signal 184.

In an example embodiment, the single-photon photodetector signals 182 and the at least one additional photodetector signal 184 may be input into the logic unit 130.

In such scenarios, the operations include forming a combined photodetector signal 190 based on a combination of the single-photon photodetector signals 182 and the at least one additional photodetector signal 184. Furthermore, the logic unit 130 may be configured to receive information indicative of an exposure condition 188. Yet further, the logic unit 130 may be configured to receive information indicative of a high dynamic range profile 189. In such scenarios, forming the combined photodetector signal 190 could be based, at least in part on the exposure condition 188 and/or the high dynamic range profile 189.

Figure 2A:
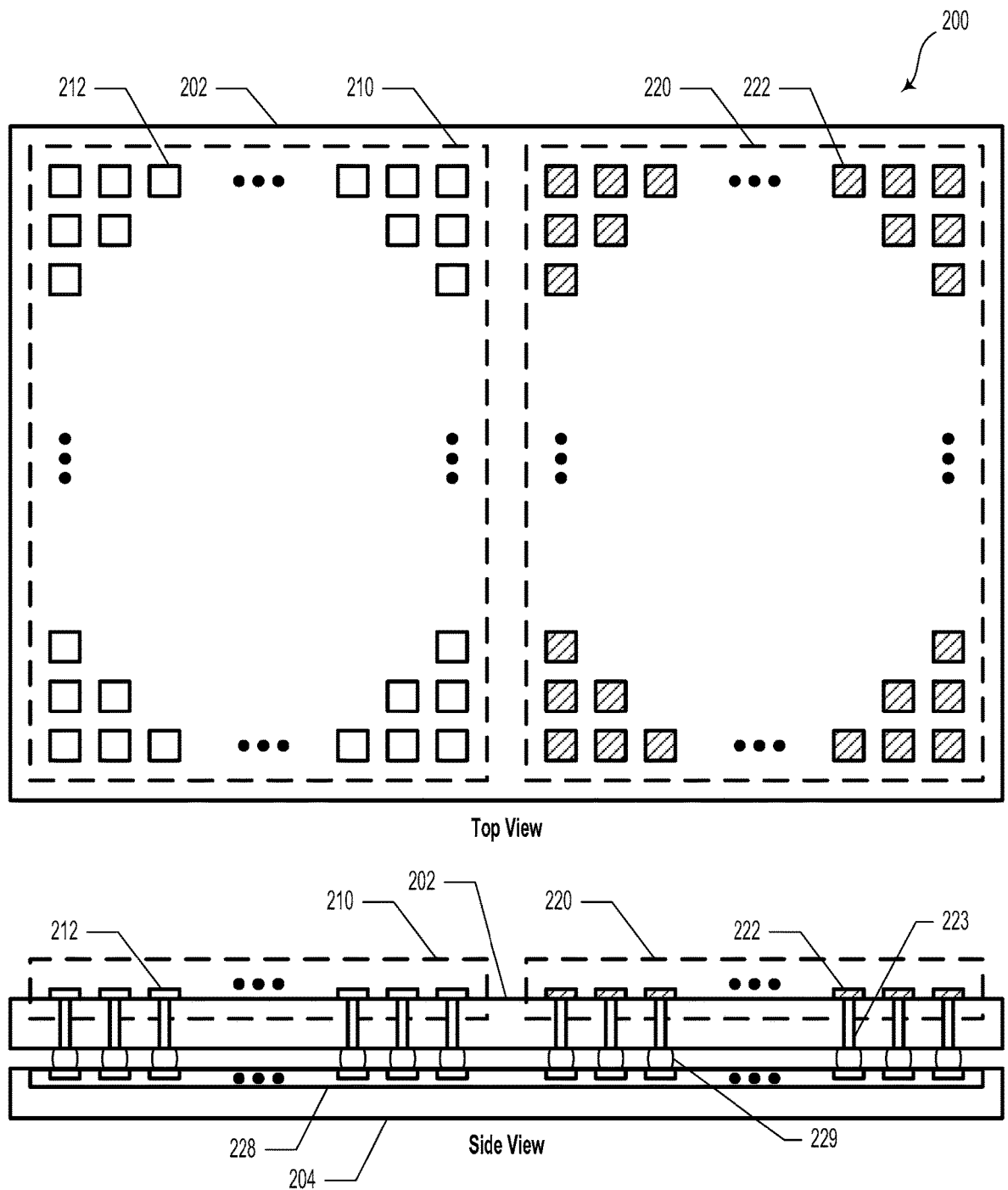
FIG. 2A illustrates a system, according to an example embodiment.

FIG. 2A illustrates a system 200, according to an example embodiment. System 200 may include elements that are similar or identical to systems 100 and 160 as illustrated and described with reference to FIGS. 1A and 1B. The system 200 includes a first substrate 202 coupled to a second substrate 204. The first substrate 202 may include a plurality of single-photon photodetectors 210 and at least one additional photodetector 220. In such a scenario, the plurality of single-photon photodetectors 210 may include a plurality of photodetectors of a first type 212. For example, the plurality of photodetectors of the first type 212 could be disposed in a rectangular array along a first surface of the first substrate 202. Furthermore, the at least one additional photodetector 220 could include one or more photodetectors of a second type 222. For example, the one or more photodetectors of the second type 222 could be disposed in a rectangular array along the first surface of the first substrate 202. That is, the respective types of photodetectors could be disposed next to one another along a surface of the first substrate 202.

In an example embodiment, the respective photodetectors of the plurality of single-photon photodetectors 210 and the at least one additional photodetector 220 could be coupled to photodetector output circuitry 228 (e.g., a readout integrated circuit (ROIC)) on the second substrate 204 by way of respective arrays of through-wafer vias 223 and bump bonds 229. Other types of electrically-conductive or wireless connections are contemplated herein.

Figure 2B:
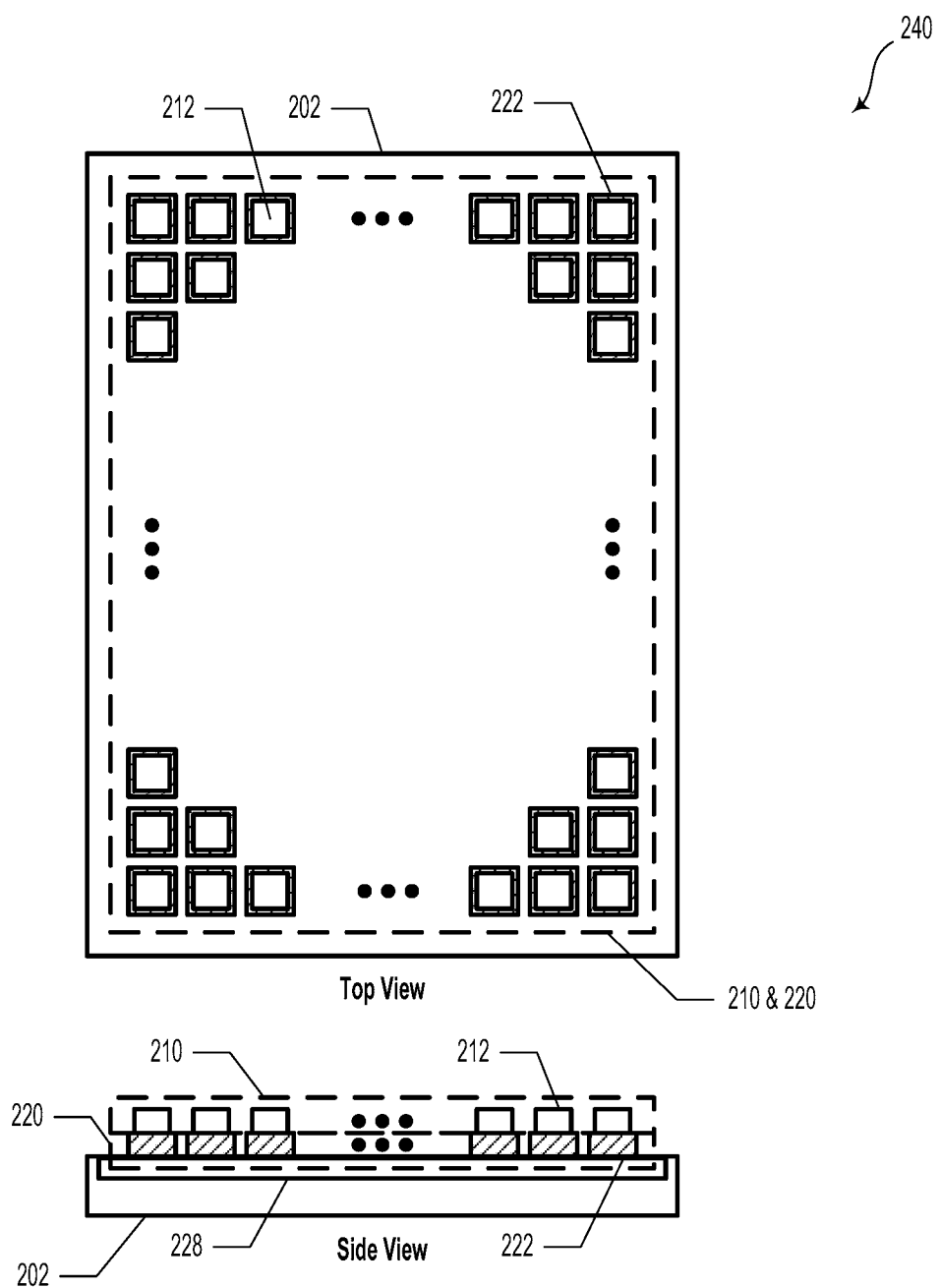
FIG. 2B illustrates a system, according to an example embodiment.

FIG. 2B illustrates a system 240, according to an example embodiment. System 240 may include elements that are similar or identical to systems 100, 160, and/or 200 as illustrated and described with reference to FIGS. 1A, 1B, and 2A. In some example embodiments, system 240 may include the plurality of single-photon photodetectors 210 being disposed as physically coupled to the at least one additional photodetector 220. As an example, the plurality of photodetectors of the first type 212 may be stacked on the one or more photodetectors of the second type 222. Furthermore, in some embodiments, the photodetector output circuitry 228 could be located on the first substrate 202. Other embodiments may include the plurality of single-photon photodetectors 210 as being disposed in different orientations with respect to the at least one additional photodetector 220.

Figure 3:
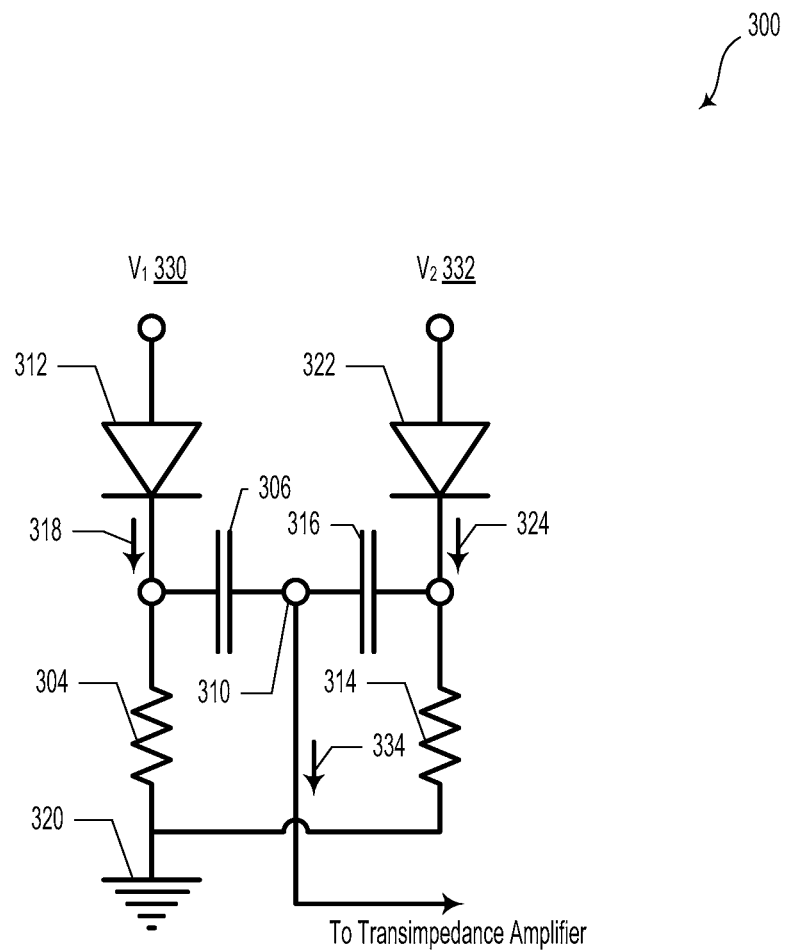
FIG. 3 illustrates a circuit, according to an example embodiment.

FIG. 3 illustrates a circuit 300, according to an example embodiment. Circuit 300 may be similar or identical to portions of systems 100, 160, 181, 200, and/or 240 as illustrated and described in reference to FIGS. 1A, 1B, 1C, 2A, and 2B. In an example embodiment, circuit 300 may describe a way for an amplifier chain to process one or both signals from a given photodetector of the first type 312 and a corresponding photodetector of the second type 322.

For example, the photodetector of the first type 312 may be connected between a first reference voltage 330 and a first resistor 304. The first resistor 304 may be connected to ground 320. Furthermore, circuit 300 may include the photodetector of the second type 322, which may be connected between a second reference voltage 332 and a second resistor 314. The second resistor 314 may be connected to the ground 320. Additionally, a first capacitor 306 and a second capacitor 316 may be connected between the output of their respective photodetectors and a reference node 310. The voltage or current detected at the reference node 310 could be output to a transimpedance amplifier (TIA) or another type of signal output.

In such a scenario, values of various components of circuit 300, such as the resistors 304, 314 and capacitors 306, 316, may be adjusted and/or selected so as to adjust an output photosignal 334 that is provided to the transimpedance amplifier. In other words, by selecting or adjusting the component values, the first photosignal 318 and second photosignal 324 may be mixed or otherwise combined to a desired degree prior to providing the output photosignal 334. Such adjustment could additionally or alternatively provide various frequency dependent behaviors. That is, a frequency response of the circuit 300 may be adjusted by changing component values of the resistors 304, 314, and capacitors 306 and 316.

The RC filter (e.g., first resistor 304 and first capacitor 306) associated with the first photodetector 312 (e.g., a SiPM detector) may tune recovery time and ambient light response. The RC filter (e.g., second resistor 314 and second capacitor 316) associated with the second photodetector 322 (e.g., an LmAPD detector) may be operable to tune a rejection level of ambient or DC light sources. It will be understood that variations are possible based on this circuit arrangement. For instance, either of the first resistor 304 or the second resistor 314 could be replaced by a regular diode to modulate photodetector saturation behavior. Furthermore, joint or individual biasing circuits (e.g., to provide first reference voltage $V_1$ 330 and second reference voltage $V_2$ 332) could be added to further tailor the amplitude, duration, shape, and/or other aspects of the first photosignal 318, the second photosignal 324, and/or the output photosignal 334.

While circuit 300 illustrates one possible circuit configured to combine the respective signals of the first photodetector 312 and the second photodetector 322, other circuits are possible. For example, the respective photodetectors 312 and 322 could have different configurations, which may include respective amplifiers and outputs.

In some embodiments, circuit 300 may include a pole-zero configuration. For example, one or more resistors could be placed in parallel with the first capacitor 306 and/or the second capacitor 316.

In some embodiments, the SiPM and/or the LmAPD may be specifically sized in terms of detector area. For example, one or more dimensions of the LmAPD may be selected so as to provide a desired high intensity response, which may be less strong than the small signal response due to the SiPM.

Furthermore, the LmAPD dimensions may be selected so as to be small enough that its noise does not approach or exceed the single photon response of the SiPM, which may lead to loss of sensitivity at small signals.

III. Example Methods

Figure 4:
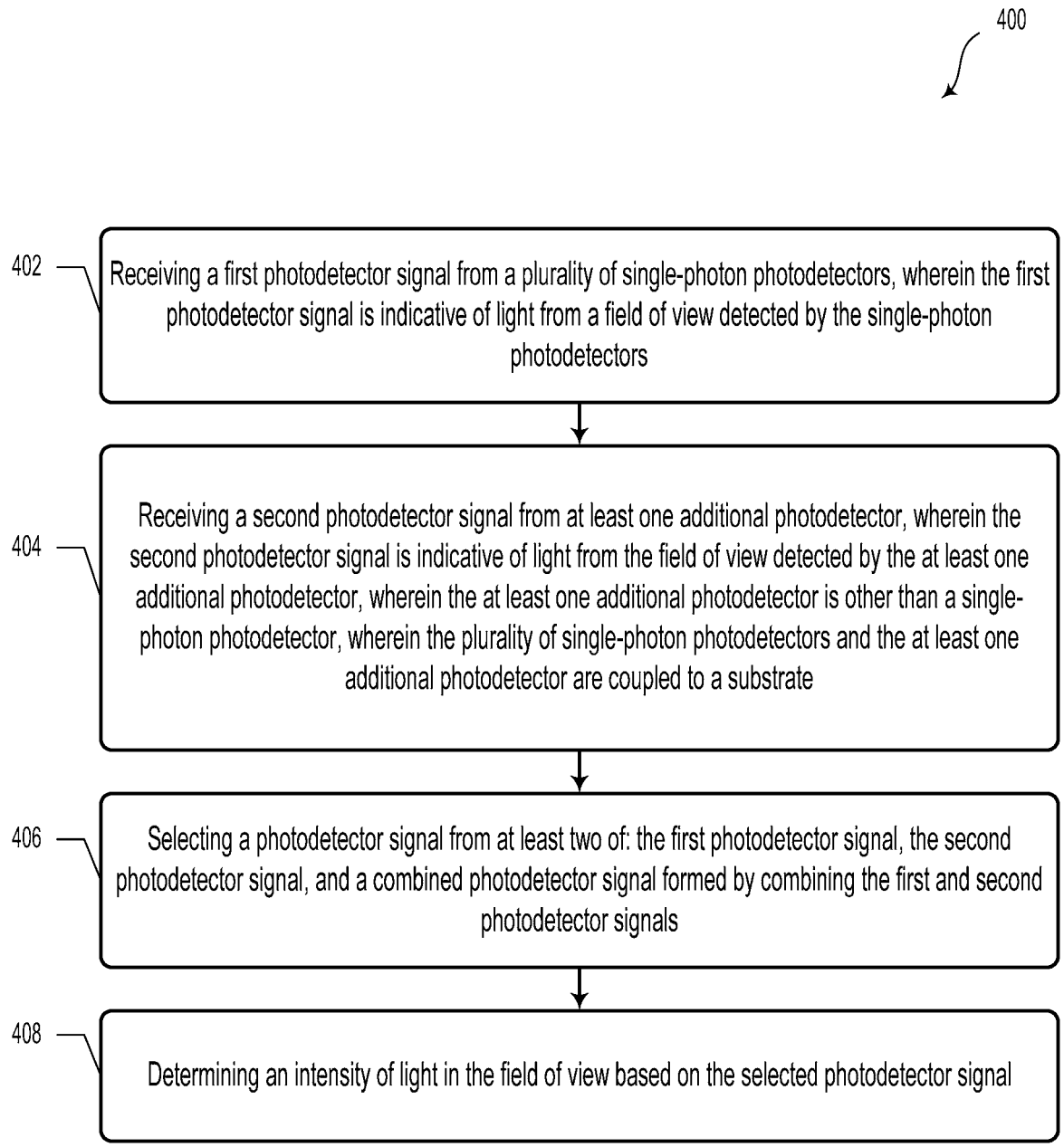
FIG. 4 illustrates a method, according to an example embodiment.

FIG. 4 illustrates a method 400, according to an example embodiment. Method 400 may be carried out, in full or in part, by system 100, controller 150, system 160, system 200, system 240, or circuit 300 as illustrated and described in reference to FIGS. 1A, 1B, 2A, 2B, and 3. Method 400 may include elements that are similar or identical to those illustrated and described with reference to FIGS. 1A, 1B, 2A, 2B, and 3. It will be understood that the method 400 may include fewer or more steps or blocks than those expressly disclosed herein. Furthermore, respective steps or blocks of method 400 may be performed in any order and each step or block may be performed one or more times.

Block 402 includes receiving a first photodetector signal from a plurality of single-photon photodetectors. The first photodetector signal is indicative of light from a field of view detected by the single-photon photodetectors.

Block 404 includes receiving a second photodetector signal from at least one additional photodetector. The second photodetector signal is indicative of light from the field of view detected by the at least one additional photodetector. The plurality of single-photon photodetectors includes photodetectors of a first photodetector type. The at least one additional photodetector includes photodetectors of a second photodetector type (e.g., the at least one additional photodetector is other than a single-photon photodetector). The plurality of single-photon photodetectors and the at least one additional photodetector are coupled to a substrate. In some embodiments, the first photodetector type includes silicon photomultiplier (SiPM) detectors. Additionally or alternatively, the second photodetector type could include linear mode avalanche photodiode (APD) detectors.

As described elsewhere herein, some embodiments may include the plurality of single-photon photodetector and the at least one additional photodetector as being arranged on different substrates.

Block 406 includes selecting a photodetector signal from at least two of: the first photodetector signal, the second photodetector signal, and a combined photodetector signal formed by combining the first and second photodetector signals.

Block 408 includes determining an intensity of light in the field of view based on the selected photodetector signal. As an example, determining the intensity of light in the field of view could include determining at least a portion of a point cloud from a LIDAR device.

In some embodiments, selecting the photodetector signal may include comparing the first photodetector signal to a first threshold. In such scenarios, in response to a determination that the first photodetector signal is less than the first threshold, the method 400 may include selecting the first photodetector signal as the selected photodetector signal.

Additionally or alternatively, selecting the photodetector signal may include comparing the second photodetector signal to a second threshold. In such scenarios, in response to a determination that the second photodetector signal is greater than the second threshold, the method 400 may include selecting the second photodetector signal as the selected photodetector signal.

In some embodiments, selecting the photodetector signal may include comparing the first photodetector signal to a first threshold and comparing the second photodetector signal to a second threshold. In such scenarios, in response to a determination that the first photodetector signal is greater than the first threshold and the second photodetector signal is less than the second threshold, the method 400 may include combining the first and second photodetector signals and selecting the combined photodetector signal as the selected photodetector signal.

In some embodiments, combining the first and second photodetector signals may include adjusting the first photodetector signal. As an example, adjusting the first photodetector signal may include multiplying the first photodetector signal by a first value of a high dynamic range profile. Combining the first and second photodetector signals may also include adjusting the second photodetector signal. Such adjustment of the second photodetector signal may include multiplying the second photodetector signal by a second value of the high dynamic range profile. In such scenarios, combining the first and second photodetector signals may include summing the adjusted first and second photodetector signals.

As described elsewhere herein, the first photodetector type may include, without limitation, silicon photomultiplier (SiPM) detectors. Additionally or alternatively, the second photodetector type may include, without limitation, avalanche photodiode (APD) detectors.

Optionally, method 400 may also include causing a plurality of light sources to emit light into an external environment so as to interact with objects in the external environment to provide reflected light. In such scenarios, the light detected from the shared field of view may include at least a portion of the reflected light.

In some embodiments, method 400 may also include routing respective photodetector signals of the first photodetector array to a first input channel of a logic unit and routing respective photodetector signals of the at least one additional photodetector to a second input channel of the logic unit.

In some embodiments, method 400 also includes receiving information indicative of an exposure condition of at least a portion of the shared field of view. In such scenarios, combining the first and second photodetector signals may be based on the received information indicative of the exposure condition.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system for providing information about one or more objects in an environment external to a vehicle, the system comprising:
a substrate;
a plurality of single-photon photodetectors coupled to the substrate, wherein the single-photon photodetectors are arranged to detect light from a field of view of an environment external to a vehicle;
at least one additional photodetector coupled to the substrate, wherein the at least one additional photodetector is other than a single-photon photodetector, wherein the at least one additional photodetector is arranged to detect light from at least a portion of the same field of view of the environment external to the vehicle; and a controller associated with the vehicle and configured to execute program instructions so as to carry out operations, the operations comprising:
receiving a first photodetector signal from the plurality of single-photon photodetectors, wherein the first photodetector signal is indicative of light detected by the single-photon photodetectors from the portion of the same field of view;
receiving a second photodetector signal from the at least one additional photodetector, wherein the second photodetector signal is indicative of light detected by the at least one additional photodetector from the portion of the same field of view;
based on a comparison of the first photodetector signal to a first threshold and a comparison of the second photodetector signal to a second threshold, selecting a responsive action from a set of responsive actions comprising:
a first responsive action comprising selecting the first photodetector signal as being representative of a light intensity in the portion of the same field of view,
a second responsive action comprising selecting the second photodetector signal as being representative of the light intensity in the portion of the same field of view, and
a third responsive action comprising selecting a combined photodetector signal formed by combining the first and second photodetector signals as being representative of the light intensity in the portion of the same field of view; and
performing the selected responsive action.

2. The system of claim 1,
wherein the first responsive action further comprises determining, based on the selected first photodetector signal, first point cloud data about at least one object in the portion of the same field of view;
wherein the second responsive action further comprises determining, based on the selected first photodetector signal, second point cloud data about at least one object in the portion of the same field of view; and
wherein the third responsive action further comprises determining, based on the selected combined photodetector signal, third point cloud data about at least one object in the portion of the same field of view.

3. The system of claim 1, wherein combining the first and second photodetector signals to form the combined photodetector signal comprises:
adjusting the first photodetector signal based on a high dynamic range profile, wherein the high dynamic range profile comprises one or more of a range of exposure conditions or a range of photon flux levels, and wherein adjusting the first photodetector signal comprises multiplying the first photodetector signal by a first value of the high dynamic range profile, and wherein the first value corresponds to one or more of the range of exposure conditions or the range of photon flux levels;
adjusting the second photodetector signal based on the high dynamic range profile, wherein adjusting the second photodetector signal comprises multiplying the second photodetector signal by a second value of the high dynamic range profile, and wherein the second value corresponds to one or more of the range of exposure conditions or the range of photon flux levels; and
summing the adjusted first and second photodetector signals to form the combined photodetector signal.

4. The system of claim 1, further comprising a plurality of light sources, the operations further comprising:
controlling the plurality of light sources to emit light into the environment external to the vehicle so as to interact with objects in the environment to provide reflected light, wherein the light detected from the portion of the same field of view comprises at least a portion of the reflected light.

5. The system of claim 1, wherein the system comprises at least a portion of a light detection and ranging (LIDAR) system associated with the vehicle.

6. The system of claim 1, wherein the substrate comprises a first surface, wherein the plurality of single-photon photodetectors and the at least one additional photodetector are coupled to the first surface.

7. The system of claim 1, wherein the plurality of single-photon photodetectors is coupled to an upper surface of the at least one additional photodetector so as to form a stacked photodetector arrangement.

8. The system of claim 1, wherein the substrate comprises a first surface along a primary plane, wherein at least a portion of detectors of the plurality of single-photon photodetectors are arranged along the first surface among at least a portion of detectors of the at least one additional photodetector so as to form an intermingled photodetector arrangement.

9. The system of claim 1, wherein the plurality of single-photon photodetectors comprises a silicon photomultiplier (SiPM) detector, wherein the at least one additional photodetector comprises at least one of: an avalanche photodiode (APD) detector or a PIN photodiode detector.

10. A non-transitory computer-readable storage medium, having stored thereon program instructions that, upon execution by one or more processors of a system configured for providing information about one or more objects in an environment external to a vehicle, cause the one or more processors to perform operations comprising:
receiving a first photodetector signal from a plurality of single-photon photodetectors coupled to a substrate, wherein the single-photon photodetectors are arranged to detect light from a field of view of an environment external to a vehicle, and wherein the first photodetector signal is indicative of light detected by the single-photon photodetectors from the field of view;
receiving a second photodetector signal from at least one additional photodetector coupled to the substrate, wherein the at least one additional photodetector is other than a single-photon photodetector, wherein the at least one additional photodetector is arranged to detect light from at least a portion of the same field of view of the environment external to the vehicle, and wherein the second photodetector signal is indicative of light detected by the at least one additional photodetector from the portion of the same field of view;
based on a comparison of the first photodetector signal to a first threshold and a comparison of the second photodetector signal to a second threshold, selecting a responsive action from a set of responsive actions comprising:
a first responsive action comprising selecting the first photodetector signal as being representative of a light intensity in the portion of the same field of view,
a second responsive action comprising selecting the second photodetector signal as being representative of the light intensity in the portion of the same field of view, and a third responsive action comprising selecting a combined photodetector signal formed by combining the first and second photodetector signals as being representative of the light intensity in the portion of the same field of view; and performing the selected responsive action.

11. The non-transitory computer-readable storage medium of claim 10, wherein the first responsive action further comprises determining, based on the selected first photodetector signal, first point cloud data about at least one object in the portion of the same field of view;

wherein the second responsive action further comprises determining, based on the selected first photodetector signal, second point cloud data about at least one object in the portion of the same field of view; and wherein the third responsive action further comprises determining, based on the selected combined photodetector signal, third point cloud data about at least one object in the portion of the same field of view.

12. The non-transitory computer-readable storage medium of claim 10, wherein the system comprises at least a portion of a light detection and ranging (LIDAR) system associated with the vehicle.

13. A method for providing information about one or more objects in an environment external to a vehicle, the method comprising:

receiving, by at least one processor of a controlled associated with the vehicle, a first photodetector signal from a plurality of single-photon photodetectors coupled to a substrate, wherein the single-photon photodetectors are arranged to detect light from a field of view of an environment external to a vehicle, and wherein the first photodetector signal is indicative of light detected by the single-photon photodetectors from the field of view;

receiving, by the at least one processor, a second photodetector signal from at least one additional photodetector coupled to the substrate, wherein the at least one additional photodetector is other than a single-photon photodetector, wherein the at least one additional photodetector is arranged to detect light from at least a portion of the same field of view of the environment external to the vehicle, and wherein the second photodetector signal is indicative of light detected by the at least one additional photodetector from the portion of the same field of view;

based on a comparison of the first photodetector signal to a first threshold and a comparison of the second photodetector signal to a second threshold, selecting, by the at least one processor, a responsive action from a set of responsive actions comprising:

a first responsive action comprising selecting the first photodetector signal as being representative of a light intensity in the portion of the same field of view;

a second responsive action comprising selecting the second photodetector signal as being representative of the light intensity in the portion of the same field of view, and a third responsive action comprising selecting a combined photodetector signal formed by combining the first and second photodetector signals as being representative of the light intensity in the portion of the same field of view; and performing, by the at least one processor, the selected responsive action.

14. The method of claim 13, wherein the first responsive action further comprises determining, based on the selected first photodetector signal, first point cloud data about at least one object in the portion of the same field of view;

wherein the second responsive action further comprises determining, based on the selected first photodetector signal, second point cloud data about at least one object in the portion of the same field of view; and wherein the third responsive action further comprises determining, based on the selected combined photodetector signal, third point cloud data about at least one object in the portion of the same field of view.

15. The system of claim 1, wherein the first threshold is associated with a first light level below which signals from the single-photon photodetectors are expected to represent the light intensity in the portion of the same field of view, and wherein selecting the responsive action from the set of responsive actions based on the comparison of the first photodetector signal to the first threshold and the comparison of the second photodetector signal to the second threshold comprises selecting the first responsive action based on the first photodetector signal being below the first threshold.

16. The system of claim 1, wherein the second threshold is associated with a second light level above which signals from the at least one additional photodetector are expected to represent the light intensity in the portion of the same field of view, and wherein selecting the responsive action from the set of responsive actions based on the comparison of the first photodetector signal to the first threshold and the comparison of the second photodetector signal to the second threshold comprises selecting the second responsive action based on the second photodetector signal being above the second threshold.

17. The system of claim 1, wherein the first threshold is associated with a first light level below which signals from the single-photon photodetectors are expected to represent the light intensity in the portion of the same field of view, wherein the second threshold is associated with a second light level above which signals from the at least one additional photodetector are expected to represent the light intensity in the portion of the same field of view, wherein the second threshold is higher than the first threshold, wherein the second light level is higher than the first light level, wherein the third responsive action further comprises combining the first and second photodetector signals to form the combined photodetector signal, and wherein selecting the responsive action from the set of responsive actions based on the comparison of the first photodetector signal to the first threshold and the comparison of the second photodetector signal to the second threshold comprises selecting the third responsive action based on (i) the first photodetector signal being above the first threshold and (ii) the second photodetector signal being below the second threshold.

18. The non-transitory computer-readable storage medium of claim 10, wherein the first threshold is associated with a first light level below which signals from the single-photon photodetectors are expected to represent the light intensity in the portion of the same field of view, and wherein selecting the responsive action from the set of responsive actions based on the comparison of the first photodetector signal to the first threshold and the comparison of the second photodetector signal to the second threshold comprises selecting the first responsive action based on the first photodetector signal being below the first threshold.

19. The non-transitory computer-readable storage medium of claim 10, wherein the second threshold is associated with a second light level above which signals from the at least one additional photodetector are expected to represent the light intensity in the portion of the same field of view, and wherein selecting the responsive action from the set of responsive actions based on the comparison of the first photodetector signal to the first threshold and the comparison of the second photodetector signal to the second threshold comprises selecting the second responsive action based on the second photodetector signal being above the second threshold.

20. The non-transitory computer-readable storage medium of claim 10, wherein the first threshold is associated with a first light level below which signals from the single-photon photodetectors are expected to represent the light intensity in the portion of the same field of view, wherein the second threshold is associated with a second light level above which signals from the at least one additional photodetector are expected to represent the light intensity in the portion of the same field of view, wherein the second threshold is higher than the first threshold, wherein the second light level is higher than the first light level, wherein the third responsive action further comprises combining the first and second photodetector signals to form the combined photodetector signal, and wherein selecting the responsive action from the set of responsive actions based on the comparison of the first photodetector signal to the first threshold and the comparison of the second photodetector signal to the second threshold comprises selecting the third responsive action based on (i) the first photodetector signal being above the first threshold and (ii) the second photodetector signal being below the second threshold.

* * * * *